United States Patent
Chen et al.

(10) Patent No.: US 12,143,962 B2
(45) Date of Patent: Nov. 12, 2024

(54) METHOD OF PERFORMING A PAGING RECEPTION AND USER EQUIPMENT USING THE SAME

(71) Applicant: SHARP KABUSHIKI KAISHA, Sakai (JP)

(72) Inventors: Hung-Chen Chen, Taipei (TW); Mei-Ju Shih, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 309 days.

(21) Appl. No.: 17/560,088

(22) Filed: Dec. 22, 2021

(65) Prior Publication Data

US 2022/0217675 A1 Jul. 7, 2022

Related U.S. Application Data

(60) Provisional application No. 63/134,939, filed on Jan. 7, 2021.

(51) Int. Cl.
*H04W 68/02* (2009.01)

(52) U.S. Cl.
CPC .................... *H04W 68/02* (2013.01)

(58) Field of Classification Search
CPC ............... H04W 68/02; H04W 68/00
USPC .......................................... 455/458
See application file for complete search history.

(56) References Cited

U.S. PATENT DOCUMENTS

| | | |
|---|---|---|
| 2014/0162705 A1 | 6/2014 | De Wit et al. |
| 2019/0174394 A1* | 6/2019 | Lu ..................... H04W 28/0268 |
| 2020/0305118 A1* | 9/2020 | Ryu ....................... H04W 76/10 |
| 2021/0105866 A1* | 4/2021 | Kavuri ................. H04W 76/27 |
| 2023/0144750 A1* | 5/2023 | Agiwal ................ H04W 76/27 |
| | | 455/422.1 |
| 2023/0262650 A1* | 8/2023 | Wong .................. H04W 60/005 |
| | | 455/458 |
| 2023/0389119 A1* | 11/2023 | Araujo .................. H04W 76/16 |

FOREIGN PATENT DOCUMENTS

| | | |
|---|---|---|
| CN | 1551676 | 12/2004 |
| CN | 101064932 | 10/2007 |
| CN | 101547508 | 9/2009 |
| CN | 101577965 | 11/2009 |

(Continued)

OTHER PUBLICATIONS

Qualcomm Incorporated (SA2 LS on Multi-USIM devices; 3GPP TSG-RAN WG3 Meeting #110-e; R3-206552; Nov. 2020) (Year: 2020).*

(Continued)

*Primary Examiner* — Hirdepal Singh
(74) *Attorney, Agent, or Firm* — ScienBiziP, P.C.

(57) ABSTRACT

A method of performing a paging reception and a UE using the same are provided. The method includes: receiving a paging message, wherein the paging message comprises a first list; determining whether a UE identity of the UE included in the first list; determining whether a paging cause corresponding to the UE identity indicated by a second list of the paging message after determining that the UE identity included in the first list; and forwarding the paging cause to an upper layer of the UE in response to the paging cause being indicated by the second list.

18 Claims, 3 Drawing Sheets

(56) References Cited

FOREIGN PATENT DOCUMENTS

| CN | 102143584 | 8/2011 |
|---|---|---|
| CN | 102857876 | 1/2013 |
| CN | 106612521 | 5/2017 |
| WO | 2004017581 | 2/2004 |
| WO | 2012042379 | 4/2012 |

OTHER PUBLICATIONS

Intel, Huawei, "IMS paging type differentiation for PS domain", 3GPP SA WG2 Meeting #116-BIS, S2-164763, Aug. 29-Sep. 2, 2016, pp. 1-15.

Oppo, "KI#1, update of paging cause solution and conclusion proposal", SA WG2 Meeting #141E, S2-2006998, Oct. 12-23, 2020, pp. 1-7.

"Office Action of China Counterpart Application", issued on Jul. 12, 2023, p. 1-p. 9.

3GPP, "Technical Specification, 3rd Generation Partnership Project; Technical Specification Group Radio Access Network; NR; Multiplexing and channel coding (Release 16)." 3GPP TS 38.212 V16.3.0, Sep. 2020, pp. 1-152.

3GPP, "Technical Specification, 3rd Generation Partnership Project; Technical Specification Group Radio Access Network; Evolved Universal Terrestrial Radio Access (E-UTRA) and NR; Multi-connectivity; Stage 2(Release 16)." 3GPP TS 37.340 V16.4.0, Dec. 2020, pp. 1-84.

3GPP, "Technical Specification, 3rd Generation Partnership Project; Technical Specification Group Radio Access Network; NR; Radio Resource Control (RRC) protocol specification (Release 16)." 3GPP TS 38.331 V16.3.0, Dec. 2020, pp. 1-932.

Nokia et al., "Changes to S1AP to support paging optimization", 3GPP TSG-RAN WG3 Meeting #63, R3-090655, Feb. 9-13, 2009, pp. 1-4.

Qualcomm Incorporated, "SA2 LS on Multi-USIM devices", 3GPP TSG-RAN WG3 Meeting #110-e, R3-206552,, Nov. 12, 2020, pp. 1-5.

"Search Report of Europe Counterpart Application", issued on May 2, 2022, p. 1-p. 11.

Intel et al., "Paging cause introduction", 3GPP SA WG2 Meeting #129-BIS, S2-1812346, Nov. 26-30, 2018, pp. 1-8.

Liu; Ming-Na et al., "Optimization of Paging Discard in GSM Network", Communications Technology, Aug. 10, 2010, with English abstract, pp. 225-227, vol. 43, No. 8.

* cited by examiner

METHOD OF PERFORMING A PAGING RECEPTION AND USER EQUIPMENT USING THE SAME

CROSS-REFERENCE TO RELATED APPLICATION

The present application claims the benefit of and priority to U.S. Provisional Patent Application Ser. No. 63/134,939, filed on Jan. 7, 2021, entitled "PAGING MECHANISM FOR SUPPORTING MULTI-SIM OPERATION", the content of which is hereby incorporated fully by reference herein into the present disclosure.

BACKGROUND

Technical Field

The present disclosure generally relates to wireless communication, and more particularly, to a method of performing a paging reception and a user equipment (UE) using the same.

Description of Related Art

Multi-USIM (Universal Subscriber Identity Module) devices have been more and more popular in different areas and countries. For example, a user may have both a personal and a business subscription in one device or has two personal subscriptions in one device for different services (e.g., use one individual subscription and one "family circle" plan). However, support for multi-USIM within a device is currently handled in an implementation-specific manner without any support from 3GPP (3rd Generation Partnership Project) specifications, resulting in a variety of implementations and UE behaviors. Such situation may cause the increasing complexity for UE vendors, unexpected UE behavior for network vendors or operators, and degraded user experience. It would be beneficial to provide standardizing support for a multi-USIM or multi-SIM (Subscriber Identity Module) UE from a performance perspective in that network functionality can be based on predictable UE behavior.

SUMMARY

The present disclosure is directed to a method of performing a paging reception and a UE using the same.

The disclosure provides a method of performing a paging reception, adapted to a user equipment (UE), wherein the method comprising: receiving a paging message, wherein the paging message comprises a first list; determining whether a UE identity of the UE included in the first list; determining whether a paging cause corresponding to the UE identity indicated by a second list of the paging message after determining that the UE identity included in the first list; and forwarding the paging cause to an upper layer of the UE in response to the paging cause being indicated by the second list.

In one embodiment of the disclosure, a number of entries of the first list is equal to a number of entries of the second list.

In one embodiment of the disclosure, the method further comprising: determining the paging cause is associated with a voice service in response to the paging cause being in the second list.

In one embodiment of the disclosure, the second list comprises an entry corresponding to the paging cause, wherein the method further comprising: determining the paging cause is associated with a service other than the voice service in response to the paging cause of the entry being not present.

In one embodiment of the disclosure, the method further comprising: transmitting a second message, wherein the second message indicates a capability of supporting multiple subscriber identity module (multi-SIM) operations.

In one embodiment of the disclosure, the method further comprising: receiving a scheduling gap configuration from a first network via a radio resource control (RRC) connection between the UE and the first network; and monitoring a second network according to the scheduling gap configuration to receive the paging message.

In one embodiment of the disclosure, the method further comprising: transmitting, by the upper layer, an indication to an RRC layer of the UE according to the paging cause.

In one embodiment of the disclosure, the method further comprising: transmitting a network switch request message to the first network according to the indication.

In one embodiment of the disclosure, the method further comprising: transmitting a busy indication to the second network according to the indication.

In one embodiment of the disclosure, the method further comprising: forwarding the UE identity to the upper layer in response to the UE identity being in the first list.

The disclosure provides a user equipment (UE) comprising: one or more non-transitory computer-readable media having computer-executable instructions embodied thereon; and at least one processor coupled to the one or more non-transitory computer-readable media, and configured to execute the computer-executable instructions to: receive a paging message, wherein the paging message comprises a first list; determine whether a UE identity of the UE included in the first list; determining whether a paging cause corresponding to the UE identity indicated by a second list of the paging message after determining that the UE identity included in the first list; and forward the paging cause to an upper layer of the UE in response to the paging cause being indicated by the second list.

In one embodiment of the disclosure, a number of entries of the first list is equal to a number of entries of the second list.

In one embodiment of the disclosure, the at least one processor configured to execute the computer-executable instructions further to: determine the paging cause is associated with a voice service in response to the paging cause being in the second list.

In one embodiment of the disclosure, the second list comprises an entry corresponding to the paging cause, wherein the at least one processor configured to execute the computer-executable instructions further to: determine the paging cause is associated with a service other than the voice service in response to the paging cause of the entry being not present.

In one embodiment of the disclosure, the at least one processor configured to execute the computer-executable instructions further to: transmit a second message, wherein the second message indicates a capability of supporting multiple subscriber identity module (multi-SIM) operations.

In one embodiment of the disclosure, the at least one processor configured to execute the computer-executable instructions further to: receive a scheduling gap configuration from a first network via a radio resource control (RRC) connection between the UE and the first network; and monitor a second network according to the scheduling gap configuration to receive the paging message.

In one embodiment of the disclosure, the at least one processor configured to execute the computer-executable instructions further to: transmit, by the upper layer, an indication to an RRC layer of the UE according to the paging cause.

In one embodiment of the disclosure, the at least one processor configured to execute the computer-executable instructions further to: transmit a network switch request message to the first network according to the indication.

In one embodiment of the disclosure, the at least one processor configured to execute the computer-executable instructions further to: transmit a busy indication to the second network according to the indication.

In one embodiment of the disclosure, the at least one processor configured to execute the computer-executable instructions further to: forward the UE identity to the upper layer in response to the UE identity being in the first list.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
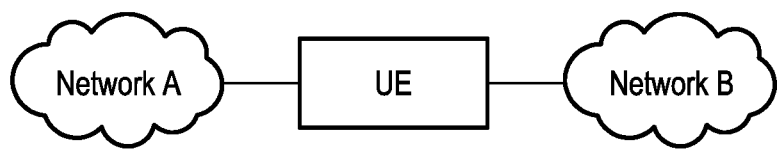
FIG. 1 illustrates a schematic diagram of UE and networks according to an embodiment of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

FIG. 1 illustrates a schematic diagram of UE and networks according to an embodiment of the present disclosure. For a multi-USIM (or multi-SIM) UE, it may happen that the UE is actively communicating with a network A while another network B pages the UE. However, whether or not the UE may respond the received paging of the network B is not defined in the current specification and the UE behavior may not be aware by the network B. For example, if the UE decided not to respond a paging (e.g., there are some important on-going services on network A), the network B may keep trying to page the UE and unnecessary resource(s) and/or power wasting may be occurred. In another example, if the UE can realize that the paging is important or is of interest, the UE may consider disconnecting the network A and build the connection to the network B in response to the paging (e.g., when the UE only supports "Dual SIM Dual Standby" mode or is implemented by single-TX and dual-RX or single-TX and single-RX architecture).

Therefore, methods of performing a paging reception for a UE operating in multi-SIM operation are required to let a UE to realize a paging cause of a paging and/or to let a network to realize that if a UE may answer/respond its paging or not. The corresponding UE behavior and the associated procedure are also required to be defined.

The present disclosure is generally related to wireless communications, and specifically, to a method of performing a paging reception and a UE using the same method for operating in multi-sim operation. In the present disclosure, various methods for a multi-SIM UE to notify whether it may respond a paging or ignore/not receive a paging from a network are provided. Moreover, the corresponding UE behavior and the associated procedures are disclosed in the present implementations. Noted that the term "multi-SIM" and the term "multi-USIM" in the disclosure are exchangeable.

A Multi-SIM device (e.g., UE) may operate either in Dual SIM Dual Standby (DSDS) mode or Dual SIM Dual Active (DSDA) mode, but not limited to. DSDS and DSDA are defined as the below (e.g., as introduced in 3GPP specification TR 22.834).

DSDS: both SIMs can be used for idle-mode network connection, but when a radio connection is active, the other connection is disabled. As in the passive case, the SIMs in a DSDS device share a single transceiver. Through time multiplexing two radio connections are maintained in idle mode. When the UE is in-call on network for one SIM, it is no longer possible to maintain radio connection to the network of the other SIM. Hence, the connection to the network of the other SIM is unavailable for the duration of the call. Registration to the other network is maintained.

DSDA: both SIMs can be used in both idle and connected modes. Each SIM has a dedicated transceiver, meaning that there are no interdependencies on idle or connected mode operation at the modem level.

Based on the device implementation choices, several architectures for multi-SIM devices may coexist in the market to support DSDS or DSDA (i.e., single Rx/single Tx, dual Rx/single Tx, or dual Rx/dual Tx). A single Rx UE is not capable of receiving traffic from two networks at the same time, while a dual Rx UE may be able to do so. A single Tx UE may not be capable of transmitting traffic to two networks at the same time, while a dual Tx UE may be able to do so.

In Multi-SIM scenarios, a UE may be (pre)configured or installed with at least two USIM(s). A USIM may be a physical SIM or eSIM. The USIMs of a UE may belong to the same operator or belong to different operators. An operator may be a public network operator (e.g., PLMN operator) or a non-public network (e.g., SNPN operator or PNI-NPN operator). The network of one USIM (e.g., associated with Network A) may be NR, LTE connected to 5GC, LTE connected EPC, multi-connectivity (e.g., EN-DC, NE-DC, NGEN-DC, NR-DC), but not limited to. For example, a UE with two USIMs may operate on a Network A (e.g., NR or LTE) and a Network B (e.g., NR or LTE). The core network of the Network A may be the same as the core network of the Network B. The core network of the Network A may be different from the core network of the Network B. For example, considering LTE connected to EPC, the Network A may refer to LTE and the core network of Network A may refer to EPC. For another example, considering NR, the Network A may refer to NR and the core network of Network A may refer to 5GC. The UE may be equipped with single-TX and single-RX, single-TX and dual-RX, or dual-TX and dual-RX.

A core network (e.g., EPC or 5GC), a base station, or an associated network (e.g., network A or network B) may transmit a paging (e.g., a paging DCI with Cyclic Redundancy Check (CRC) scrambled by paging radio network temporary identifier (P-RNTI)/other RNTI(s), a short message in a paging DCI, or a paging message) to a UE. In some implementations, the core network (e.g., EPC or 5GC) may include a paging cause in a paging (e.g., a paging DCI with CRC scrambled by P-RNTI/other RNTI(s), a short message in a paging DCI, or a paging message). In some implementations, the core network (e.g., EPC or 5GC) may include a paging cause in a CN paging (e.g., a paging message with one or more UE records, wherein the UE record may include one or more 5G-S-TMSIs).

In some implementations, the base station or the associated network (e.g., network A or network B) may include a paging cause in a paging (e.g., a paging DCI with CRC scrambled by P-RNTI/other RNTI(s), a short message in a paging DCI, or a paging message), wherein the paging cause and/or the UE ID (e.g., 5G-S-TMSI) corresponding to the paging cause may be provided/instructed by the core network (e.g., EPC or 5GC) corresponding to the base station or the associated network. In some implementations, a base station or an associated network (e.g., network A or network B) may include a paging cause in a RAN paging (e.g., a paging message with one or more UE records, wherein the UE record may include one or more full inactive RNTI (I-RNTI)). Note that I-RNTI is used to identify the suspended UE context of a UE in RRC_INACTIVE.

In some implementations, a base station or an associated network (e.g., network A or network B) may include a list of one or more UE identities (also referred to as "first list") and a list of one or more paging causes (also referred to as "second list"). Each entry of the first list may record a corresponding UE identity and each entry of the second list may record a corresponding paging cause. The first list may have a one-to-one relationship with the second list. That is, the UE identities in the first list may correspond to the paging causes in the second list respectively while the number of entries of the first list is equal to the number of entries of the second list and the entries of the first list and the entries of the second list are listed in the same order.

In some implementations, a UE record (e.g., as introduced in 3GPP specification TR 38.331) in a paging message and paging cause(s) corresponding to the UE record may both be generated by a base station or an associated network (e.g., network A or network B). A UE record may at least contain a UE identity of a UE. For example, for a RAN paging with paging cause(s), a UE record in a paging message and paging cause(s) corresponding to the UE record may both be generated by a base station. In some implementations, a UE record in a paging message may be generated by a core network (e.g., EPC or 5GC) and paging cause(s) corresponding to the UE record may be generated by a base station or an associated network (e.g., network A or network B) corresponding to the core network. For example, for a CN paging with paging cause(s), a UE record in a paging message may be generated by a core network (e.g., EPC or 5GC) and paging cause(s) corresponding to the UE record may be generated by a base station or an associated network (e.g., network A or network B) corresponding to the core network. Note that the base station may generated the corresponding paging cause(s) based on the information (e.g., service types) provided/instructed by the associated core network. In some implementations, a UE record in a paging message and paging cause(s) corresponding to the UE record may both be generated by a core network (e.g., EPC or 5GC).

In some implementations, a base station may receive the proposed paging message(s) with associated paging cause(s) for one or more UEs from the serving core network. Then, the base station may collect and schedule paged UE(s) with the same proposed paging cause, wherein the proposed paging cause may be included in the same paging UE record or the same paging message. The proposed paging cause may be indicated/scheduled by one paging DCI.

In some implementations, a base station may derive the proposed paging message(s) with associated paging cause(s) for one or more UEs by the base station itself or by other base stations (e.g., through the backhaul connections between base stations, such as Xn interface) for RAN paging. Then, the base station may also collect and schedule paged UE(s) with the same proposed paging cause, wherein the proposed paging cause may be included in the same paging UE record or the same paging message. The proposed paging cause may be indicated/scheduled by one paging DCI.

After a UE (or a RRC layer of the UE) receiving the paging message including the first list of UE identity from the base station or associated network (e.g., network A or network B), the UE may determine whether a UE identity of the UE included in the first list of UE identity (e.g., determining if the UE identity included in any entry of the first list). If the UE identity of the UE included in the first list, the UE may determine that the paging message is for the UE. Accordingly, the UE may determine whether a paging cause corresponding to the UE identity indicated by (or included in) the second list of paging cause, wherein the second list may or may not be included in the paging message. If the second list is included in the paging message and the paging cause corresponding to the UE identity is indicated by (or included in) the second list, the UE may forward the paging cause from the RRC layer of the UE to the upper layer(s) (e.g., Non-Access Stratum (NAS) layer) of the UE. In some implementations, the UE may further forward the UE identity corresponding to the paging cause from the RRC layer of the UE to the upper layer(s) of the UE.

In some implementations, the presence of a paging cause in a paging (e.g., paging message) may indicate whether the paging is related to a specific service. For example, the presence of a paging cause in a paging (or in second list of paging cause) may indicate that the paging is related to a specific service. For example, the presence of a paging cause of an entry of a second list may indicate that the cause of the paging is related to a specific service. The absence of a paging cause in a paging (or in second list of paging cause) may indicate that the paging is not related to a specific service. For example, the absence of a paging cause of an entry of a second list may indicate that the cause of the paging is not related to a specific service. The specific service may be predefined or configurable. In some implementations, the specific service may include a voice service (e.g., VoLTE, VoNR, or IP Multimedia Subsystem (IMS) voice) or high priority service(s) (e.g., multimedia priority service (MPS), mission critical service (MCS)). In some implementations, the specific service may include an IMS voice service. In some implementations, a paging without paging cause (or a paging cause of an entry of the second list is empty/absent) may indicate/imply that a paging is related to a service which is neither related to voice service(s) (e.g., VoLTE, VoNR, or IMS voice) nor high priority service(s). In some implementations, a paging without paging cause (or a paging cause of an entry of the second list is empty/absent) may indicate/imply that a paging is related to a service other than IMS voice service. That is, assuming the UE obtained the second list of paging cause from the received paging, the UE may determine that a paging cause for the UE is associated with a voice service (e.g., IMS voice service) or high priority service in response the paging cause corresponding to the UE identity of the UE being in the second list. On the other hand, the UE may determine that a paging cause for the UE is not associated with a voice service (e.g., IMS voice service) or high priority service in response to a paging cause of the corresponding entry being not present in the second list of paging cause, wherein the entry corresponds to the paging cause for the UE (or UE identity).

Note that a paging without paging cause may be delivered/transmitted by a base station (BS) supporting multi-SIM operations (e.g., a BS that can include a paging cause within a paging) or by a BS not supporting multi-SIM operations (e.g., a BS that cannot include a paging cause). In some implementations, a BS may broadcast whether itself supports multi-SIM operations (or supports providing a paging cause in a paging). In some implementations, a paging without paging cause from a BS that supports multi-SIM operations may indicate/imply that a paging is related to a service which is neither related to voice service(s) (e.g., VoLTE, VoNR, or IMS voice) nor high priority service(s). In some implementations, a paging without paging cause from a BS that does not support multi-SIM operations may indicate/imply that a paging is related to a service which is neither related to voice service(s) (e.g., VoLTE, VoNR, or IMS voice) nor high priority service(s). In this situation, the UE (or the RRC layer of the UE) may ignore the paging or may not inform the upper layer(s) about the paging. In this situation, the UE may send a network switch request message (e.g., to the serving cell) in response to the paging.

In some implementations, a paging without paging cause from a BS that does not support multi-SIM operations may indicate/imply that a paging is related to voice service (e.g., VoLTE VoNR, or IMS voice service) or high priority service(s) (e.g., MPS or MCS). In this situation, the UE (or the RRC layer of the UE) may inform the upper layer(s) about the paging. In some implementations, if a UE is operating in multi-SIM operation, any paging received from another base station (or another network) that the UE is not RRC connected to, the UE (or the RRC layer of the UE) may inform upper layer(s) about the paging or the paging information regardless of the presence of a paging cause in the paging.

In some implementations, if a paging cause is included in a paging DCI (whose CRC may be scrambled by P-RNTI/other RNTI(s)) or included in a short message, the paging cause may be associated with a UE record (or a UE list) included in an associated paging message. For example, a scheduling information of the associated paging message may be indicated in the received paging DCI. In some implementations, if a paging cause is included in a paging message, the paging cause may be associated with all UE(s) of a UE record (or a UE list) included in an associated paging message. In some implementations, if a paging cause is included in a paging message, the paging cause may be associated a specific UE.

In some implementations, there may be two separate UE records (or two separate UE lists, wherein the two separated UE lists may refer to the first list and the second list respectively). One of the two separate UE records (or one of the two separate UE lists) may be used for the normal UE paging purpose (e.g., for those UE(s) that are not operating in multi-SIM operation or for legacy UE(s) that are not supporting receiving a paging cause). One of the two separate UE records (or one of the two separate UE lists) may be used for the paging with paging cause (e.g., for those UE(s) that are operating in multi-SIM operation or for advanced UE(s) that are supporting receiving a paging cause). Note that for those UE(s) that are not operating in multi-SIM operation or for legacy UE(s) that are not supporting receiving a paging cause may ignore paging cause(s) and/or the UE record (or the UE list) which is used for a paging with a paging cause.

In some implementations, if a paging cause is included in a paging DCI (whose CRC may be scrambled by P-RNI/other RNTI) or included in a short message, the UE record (or the UE list) which is used for a paging with a paging cause may be absent or may not present. In some implementations, if a paging cause is included in a paging DCI (whose CRC may be scrambled by P-RNI/other RNTI) or included in a short message, the paging cause may be associated with the UE record (or the UE list) used for the paging with paging cause (e.g., for those UE(s) that are operating in multi-SIM operation or for advanced UE(s) that are supporting receiving a paging cause).

In some implementations, if a paging cause is included in a paging DCI, one or more fields in the paging DCI may be used to indicate paging cause(s). For example, if two fields are used, the first field may indicate that the paging cause is related to voice service (e.g., VoLTE, VoNR, or IMS voice service) or high priority service(s). The second field may indicate that the paging cause is related to other paging causes (i.e., paging causes other than voice service or high priority service). In some implementations if a paging cause is included in a paging DCI, one or more bits in a field of the paging DCI may be used to indicate paging cause(s). For example, if two bits in a field are used, the first bit may indicate that the paging cause is related to voice service (e.g., VoLTE, VoNR, or IMS voice service) or high priority service(s). The second bit may indicate that the paging cause is related to other paging causes. In another example, if two bits in a field are used, "00" may indicate paging cause A, "01" may indicate paging cause B, "10" may indicate paging C, and "11" may indicate paging cause D. Note that some value(s) of the bits may be reserved and not associated with any paging cause.

In some implementations, if a paging cause is included in a short message, one or more bits in the short message may be used to indicate paging cause(s). For example, if one bit is used, the bit may indicate that the paging cause is related to the voice service(s) (e.g., VoLTE, VoNR, or IMS service voice) or the high priority service(s). For example, if two bits are used, the first bit may indicate that the paging cause is related to voice service (e.g., VoLTE, VoNR, or IMS voice service) or high priority service(s). The second bit may indicate that the paging cause is related to other paging causes. For example, as shown in Table 1, if two bits are used, the first bit may indicate that the paging cause is related to the voice service(s) (e.g., VoLTE, VoNR, or IMS voice service). The second bit may indicate that the paging cause is related to high priority service(s). If neither of the two bits are set, the paging cause may be related to other paging causes. In this situation, a legacy UE or a UE which is not operating in multi-SIM operation may ignore the two bits for paging cause. Note that Bit 1 is the most significant bit in Table 1. For example, as shown in Table 2, if two bits in a short message (e.g., a first bit in a short message and a second bit in the same short message) are used, "00" may indicate paging cause A, "01" may indicate paging cause B, "10" may indicate paging C, and "11" may indicate paging cause D. Note that some value(s) of the bits may be reserved and not associated with any paging cause. In this situation, a legacy UE or a UE which is not operating in multi-SIM operation may ignore the two bits for paging cause. Note that short messages can be transmitted on PDCCH using P-RNTI with or without an associated paging message using Short Message field in DCI format 1_0 (which is introduced in 3GPP specification TS 38.212 v16.3.0).

TABLE 1

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this Paging Occasion. |
| 4 | Paging cause of voice service<br>If set to 1: indication of paging cause related to voice service |
| 5 | Paging cause of higher priority service<br>If set to 1: indication of paging cause related to high priority service |
| 6-8 | Not used and shall be ignored by UE if received. |

TABLE 2

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this Paging Occasion. |
| 4-5 | Paging cause Indication<br>If set to 00: indication of paging cause A (e.g., related to voice service)<br>If set to 01: indication of paging cause B (e.g., related to high priority service)<br>If set to 10: indication of paging cause C (e.g., related to other services)<br>If set to 11: indication of paging cause D or reserved |
| 6-8 | Not used and shall be ignored by UE if received. |

In some implementations, if a paging cause is included in a paging message, each UE in a UE record may be associated with a respective paging cause. A paging message may include UE record(s) in a list (also referred to as "UE list", "paging record list (PagingRecordList IE)", or "first list (of UE identity)"), wherein each of the UE record may include a UE identity. For example, assuming there are UE identities UE #1, UE #2, and UE #3 in the UE records (or UE list) of the paging message received by the UE. There may be a paging cause list (also referred to as "second list (of paging cause)") associated with the UE records (or the UE list) and the paging cause list may have the same number of entries as the number of the associated UE records (or the number of entries in the UE list). In some implementations, entries of the UE list and entries of the paging cause list are listed in the same order. For example, the paging cause list may include paging cause A, paging cause B, and paging cause C, wherein paging cause A is associated with UE #1, paging cause B is associated with UE #2, and paging cause C is associated with UE #3. In some implementations, an entry of the paging cause list may be set to "NULL" or a specific value or the content of the entry may be absent to indicate there is no paging cause for the corresponding UE. In some implementations, a paging cause may indicate that a paging is related to voice service (e.g., VoLTE, VoNR, or IMS voice service) or high priority service(s) (e.g., MPS, or MCS). In some implementations, a paging without paging cause present in the second list may indicate/imply that a paging is related to a service which is neither related to voice service(s) (e.g., VoLTE, VoNR, or IMS voice service) nor high priority service(s). In some implementations, an entry without paging cause in the second list may indicate/imply that a paging is related to a service which is not associated with IMS voice service (i.e., a service other than the IMS voice service).

In some implementations, two different RNTIs may be defined (or configured) for receiving a legacy paging (e.g., a paging without a paging cause) or for receiving an advanced paging (e.g., a paging with a paging cause). For example, a legacy UE (or a UE which is not operating in multi-SIM operation) may use existing P-RNTI to receive legacy paging (e.g., a paging DCI without a paging cause, a short message in a paging DCI without a paging cause, or paging message without a paging cause). An advanced UE (e.g., a UE which is capable of multi-SIM operation or a UE which is operating in multi-SIM operation) may use a new P-RNTI (or other RNTI) to receive advanced paging (e.g., a paging DCI with a paging cause, a short message in a paging DCI with a paging cause, or paging message with a paging cause).

In some implementations, two or more (different) CORE-SETs may be defined (or configured) for receiving a legacy paging (e.g., a paging without a paging cause) or for receiving an advanced paging (e.g., a paging with a paging cause). For example, a legacy UE (or a UE which is not operating in multi-SIM operation) may monitor a CORESET configured for legacy paging (e.g., CORESET #0) to receive legacy paging (e.g., a paging DCI without a paging cause, a short message in a paging DCI without a paging cause, or paging message without a paging cause). An advanced UE (e.g., a UE which is capable of multi-SIM operation or a UE which is operating in multi-SIM operation) may monitor another CORESET to receive advanced paging (e.g., a paging DCI with a paging cause, a short message in a paging DCI with a paging cause, or paging message with a paging cause). In some implementations, the UE may monitor conventional paging (e.g., a paging without paging cause) and advanced paging (e.g., a paging with paging cause) on the same CORESET.

In some implementations, two or more different search spaces may be defined (or configured) for receiving a legacy paging (e.g., a paging without a paging cause) or for receiving an advanced paging (e.g., a paging with a paging cause). For example, a legacy UE (or a UE which is not operating in multi-SIM operation) may monitor a search space configured for legacy paging (e.g., default/broadcasting paging search space or search space #0) to receive legacy paging (e.g., a paging DCI without a paging cause, a short message in a paging DCI without a paging cause, or paging message without a paging cause). An advanced UE (e.g., a UE which is capable of multi-SIM operation or a UE which is operating in multi-SIM operation) may monitor another search space to receive advanced paging (e.g., a paging DCI with a paging cause, a short message in a paging DCI with a paging cause, or paging message with a paging cause) and the advanced UE may or may not need not to monitor the default paging search space. In some implementations, the combination of different RNTIs, different CORESETs and/or different search spaces may be configured/used for receiving a legacy paging (e.g., a paging without a paging cause) and for receiving an advanced paging (e.g., a paging with a paging cause).

In some implementations, a multi-SIM UE may inform a network (or the corresponding base station) about its capability of supporting multi-SIM operation. In some implementations, a multi-SIM UE may inform a network (or the corresponding base station) about its capability of supporting multi-SIM operation by transmitting a message (also referred to as "second message") such as network request to the network (or the corresponding base station), wherein the message may be an RRC message. In some implementations, the UE capability described in this disclosure may be frequency-dependent. For example, the UE capability may be separately determined for Frequency Range 1 (FR1) and Frequency Range 2 (FR2), wherein FR2 is different from FR1. In some implementations, the UE capability described in this disclosure may be separately determined for Time Division Duplex (TDD) and/or Frequency Division Duplex (FDD).

In some implementations, a multi-SIM UE may inform a network (or the corresponding base station) about its architecture (or type of RF chain) for supporting multi-SIM operation. In some implementations, a multi-SIM UE may inform a network (or the corresponding base station) about its architecture for supporting multi-SIM operation by transmitting a message to the network (or the corresponding base station), wherein the message may be an RRC message. The multi-SIM UE may inform its own architecture based on a network request, wherein the network request may be transmitted from the network (or the corresponding base station) to the multi-SIM UE. For example, the UE may report its architecture for supporting multi-SIM operation to be single-TX and single-RX. For example, the UE may report its architecture for supporting multi-SIM operation to be single-TX and dual-RX. For example, the UE may report its architecture for supporting multi-SIM operation to be dual-TX and dual-RX.

In some implementations, a multi-SIM UE may inform a network (or the corresponding base station) about its mode (e.g., DSDS or DSDA) for supporting multi-SIM operation. In some implementations, a multi-SIM UE may inform a network (or the corresponding base station) about its mode (e.g., DSDS or DSDA) for supporting multi-SIM operation by transmitting a message to the network (or the corresponding base station), wherein the message may be an RRC message. The multi-SIM UE may inform its own mode (e.g., DSDS or DSDA) based on a network request, wherein the network request may be transmitted from the network (or the corresponding base station) to the multi-SIM UE. For example, the UE may report its architecture for supporting multi-SIM operation to be DSDS mode.

In some implementations, a multi-SIM UE may inform a network (or the corresponding base station) about its status of multi-SIM operation. For example, a multi-SIM UE may inform a network that its multi-SIM operation status is ON. That is, the UE may be (pre)configured or installed with at least two USIM(s) now. In case of the UE being removed (or disabled) one installed USIM, the UE may inform the network that its multi-SIM operation status is OFF. In some implementations, if the current status of multi-SIM operation is different from the previous status of multi-SIM operation reported to a network, a multi-SIM UE may inform the network its multi-SIM operation status is changed. For example, the UE may inform the network its multi-SIM operation status is "ON" in the first time. However, after the UE is removed (or disabled) one installed USIM, the UE may need to inform the network its multi-SIM operation status is "OFF" now. In some implementations, a multi-SIM UE may inform a network (or the corresponding base station) about its status of multi-SIM operation by transmitting a message to the network (or the corresponding base station), wherein the message may be an RRC message. The multi-SIM UE may inform its own status of multi-SIM operation based on a network request, wherein the network request may be transmitted from the network (or the corresponding base station) to the multi-SIM UE.

In some implementations, (e.g., based on a UE's mode of supporting multi-SIM operation, a UE's architecture of supporting multi-SIM operation, and/or a UE's state,) a base station (or an associated network) (e.g., network A or network B) may or may not include a paging cause in a paging (e.g., a paging DCI with a CRC scrambled by P-RNTI/other RNTI, a short message in a paging DCI, or paging message). For example, if a base station (or an associated base station) is aware of a UE is not operating in a multi-sim operation (e.g., based on the reported state or the UE capabilities), the base station (or the associated base station) may not include a paging cause in a paging for the UE. In some implementations, if a UE is not operating in a multi-sim operation (e.g., a legacy UE or a UE whose multi-SIM state is OFF), the UE may ignore any received paging cause. For example, if paging cause(s) is included in filed(s) of a DCI (which may be scrambled by a P-RNTI or other RNTI), the UE may ignore the field(s). For example, if paging cause(s) is included in a short message, the UE may ignore the bit(s) which is used for indicating paging cause(s). For example, if paging cause(s) is included in a paging message, the UE may ignore the related information which is used for indicating paging cause(s) (e.g., the corresponding entry in a paging cause list, the whole paging cause list, the UE record for paging with paging cause, but not limited to).

In some implementations, a base station (or an associated network) (e.g., network A or network B) may or may not include a paging cause in a paging (e.g., a paging DCI with CRC scrambled by P-RNTI/other RNTI, a short message in a paging DCI, or paging message) if the base station (or the associated network) is determined as the major one (or with higher priority among base stations). In some implementations, the UE may consider that a base station (or an associated network) is the major one (or with higher priority) based on the UE preference/implementations or the instructions from the upper layer(s) of the UE. The UE may be RRC connected with the major one. In some implementations, the UE may transmit information to a base station (or an associated network) to indicate whether the base station (or the associated network) is the major one (or with the higher priority). For example, if a base station (or an associated network) receives information/message that it is the major one for the UE, the base station (or the associated network) may not include a paging cause in a paging (e.g., a paging DCI scrambled by P-RNTI/other RNTI, a short message in a paging DCI, or paging message) because the base station (or the associated network) is determined as the major one (or with the higher priority).

The UE may ignore any received paging cause(s) or may ignore any information related to paging cause(s). For example, if a base station (or an associated network) receives a message indicating that it is not the major one for the UE, the base station (or the associated network) may include a paging cause in a paging (e.g., a paging DCI with CRC scrambled by P-RNTI/other RNTI, a short message in a paging DCI, or paging message) because the base station (or the associated network) is not determined as the major one (or with higher priority). The UE may intend to receive paging cause(s) or may intend to receive information related to paging cause(s).

In some implementations, the UE may implicitly indicate whether a base station (or an associated network) is a major one. For example, a base station which receives a scheduling request, a buffer status report, and/or uplink data from the UE may consider itself as the major one for the UE. Accordingly, the UE may be (only) allowed to send a scheduling request, a buffer status report, and/or uplink data to the major base station (or major network) while in multi-SIM operation. For example, a base station which receives an RRC signaling (e.g., RRC setup complete message, RRC resume complete message, or RRC reconfiguration complete message) from the UE may consider itself as the major one for the UE. Accordingly, the UE may be (only) allowed to transmit an RRC signaling (e.g., a RRC setup complete message, RRC resume complete message, or RRC reconfiguration complete message) to the major base station (or major network) while in multi-SIM operation. For example, a base station which receives, from the UE, an RRC signaling (e.g., RRC setup complete message, RRC resume complete message, or RRC reconfiguration complete message) including an indicator indicating the major one may consider itself as the major one for the UE. Accordingly, the UE may be (only) allowed to transmit an RRC signaling (e.g., RRC setup complete message, RRC resume complete message, or RRC reconfiguration complete message) including an indicator indicating the major one to the major base station (or major network) while in multi-SIM operation.

In some implementations, a UE (e.g., a UE which is operating in multi-sim operation) may currently connect to network A (e.g., UE may RRC connected with network A) but receiving a paging from network B. Based on the received paging and/or paging cause(s), the UE may determine whether to send a response message in response to network B or not. In some implementations, network A (which a UE currently connects to) may configure a scheduling gap for the UE to receive a paging from network B. The UE may receive the scheduling gap configuration from network A via an RRC connection between the UE and the network A. The UE may monitor network B according to the scheduling gap configuration so as to receive a paging (e.g., a paging DCI with CRC scrambled by P-RNTI/other RNTI(s), a short message in a paging DCI, or a paging message) from network B. In some implementations, network A (which the UE currently RRC connected with) may configure a scheduling gap for the UE with only one RX and/or is operating in multi-SIM operation to receive a paging from network B. During the scheduling gap for the UE to receive a paging from network B, the UE may stop DL and/or UL transmission to network A (e.g., the UE stops monitoring CORESET of network A).

In some implementations, a UE may be configured a measurement gap for measurements and a scheduling gap for receiving paging of another network (which the UE not RRC connected with). In some implementations, a UE may receive a measurement gap configuration including the information/parameters related to measurement gaps(s). In some implementations, a measurement gap configuration may include an indication for indicating if the measurement gap configuration (or the associated measurement gap) can be used for receiving a paging from another network. In some implementations, a measurement gap configuration may include an indication for indicating if the measurement gap configuration (or the associated measurement gap) is for receiving a paging from another network only. In some implementations, a measurement gap configuration may include an indication for indicating if the measurement gap configuration (or the associated measurement gap) is for both measurements and receiving a paging from another network. In some implementations, a measurement gap configuration (e.g., MeasGapConfig) may include two separate gap configurations, one is for measurements purpose and the other one is for receiving a paging from another network.

In some implementations, the scheduling gap (or measurement gap) configured to receive a paging from another network may be considered as invalid if the UE is no longer operating in multi-SIM operation (e.g., its multi-SIM state is OFF, but not limited to). In some implementations, if the UE is no longer operating in multi-SIM operation (e.g., its multi-SIM state is OFF, but not limited to), the UE (or the RRC layer of the UE) may suspend or release the configuration related to the scheduling gap (or measurement gap) configured to receive a paging from another network. In some implementations, if the UE is no longer operating in multi-SIM operation (e.g., its multi-SIM state is OFF, but not limited to), the UE (or the RRC layer of the UE) may keep (or store) the configuration related to the scheduling gap (or measurement gap) configured to receive a paging from another network but the UE (or the RRC layer of the UE) may not use the scheduling gap (or measurement gap) anymore.

In some implementations, the configuration related to the scheduling gap (or measurement gap) configured to receive a paging from another network may be broadcast in system information or transmitted via dedicated signaling. In some implementations, if only one measurement gap is configured and/or the UE is operating in multi-SIM operation, the UE may use the measurement gap for measurements and/or receiving paging from another network based on pre-defined rule(s), pre-configuration(s), or UE implementations. In some implementations, if only one measurement gap is configured and/or the UE is operating in multi-SIM operation, the UE may first use the measurement gap to receive a paging from another network. If there is no paging occasion(s) in the measurement gap, the UE may use this measurement gap to perform measurements (e.g., measure the signal qualify of a neighboring cell).

In some implementations, a UE (e.g., a UE which is operating in multi-sim operation) may be currently RRC connected with network A but receiving a paging from network B. If the received paging is for the UE (e.g., the UE's ID is included in the received UE record or UE list) with a paging cause related to voice service(s) (e.g., VoLTE, VoNR, or IMS voice service) or high priority service(s), the UE (or the RRC layer of the UE) may send a network switch request message to network A. Note that the UE's ID may be the corresponding 5G-S-TMSI or the corresponding (full) I-RNTI. Note that the network switch request message may include the information related to network B and/or the information related to the paging cause received in the paging from network B.

After the UE sends the network switch request message to network A, the UE may wait for the response message corresponding to the network switch request message from network A. If the response message from network A allows the UE to perform network switch, the UE may perform network switch to network B in order to answer the paging from network B. If the response message from the network A does not allow the UE to perform network switch, the UE may not perform network switch to network B but keep in network A instead. Alternatively, after the UE sends the network switch request message to network A, the UE may perform network switch to network B (i.e., without waiting from the reception of the response message from network A).

In some implementations, after the UE sends the network switch request message to network A, whether the UE needs to wait for the response message from network A may be configured by network A. In some implementations, after the UE sends the network switch request message to network A, the UE may not wait for the response message from network A if network B is the major network. In some implementations, after the UE sends the network switch request message to network A and the network switch request message indicates for a long leaving or the UE's preferred RRC state is RRC_IDLE state, the UE may not wait for the response message. In some implementation, after the UE sends the network switch request message to network A and the network switch request message indicates for a short leaving or the UE's preferred RRC state is RRC_INACTIVE state, the UE may need to wait for the response message (e.g., a RRC release message with suspend configuration to transition to RRC_INACTIVE state).

In some implementations, a UE (e.g., a UE which is operating in multi-sim operation) may be currently RRC connected with network A but receiving a paging from network B. If the received paging is for the UE (e.g., the UE's ID is included in the received UE record or UE list) with a paging cause related to voice service(s) (e.g., VoLTE, VoNR, or IMS voice service) or high priority service(s), the UE may determine to send a network switch request message to network A based on pre-defined rule(s), pre-configured configuration(s), instructions, or UE implementations. The pre-configured configuration(s) may be the configuration(s) from Non-Access-Stratum (NAS) layer or upper layer of the UE. The instructions may be provided from NAS layer or upper layer of the UE. Note that the network switch request message may include the information related to network B and/or the information related to the paging cause.

In some implementations, a UE (e.g., a UE which is operating in multi-sim operation) may be currently RRC connected with network A but receive a paging from network B. If the received paging is for the UE (e.g., the UE's ID is included in the received UE record or UE list) with a paging cause related to voice service(s) (e.g., VoLTE, VoNR, or IMS voice service) or high priority service(s), the UE may determine to send a network switch request message to network A based on the current on-going services or the information/parameters of the current on-going services (e.g., Quality of Service (QoS) parameters). For example, if the current on-going service(s) is with lower QoS, the UE (or the RRC layer of the UE) may send a network switch request message to network A. Note that whether a going service is with lower QoS may depend on if the guaranteed bit rate or the maximum bit rate of the going service is lower than or equal to a threshold. Note that the network switch request message may include the information related to network B and/or the information related to the paging cause. For example, if the current on-going service(s) is with higher QoS, the UE (or the RRC layer of the UE) may not send a network switch request message to network A. Instead, the UE (or the RRC layer of the UE) may transmit a busy indication to network B in response to the paging.

How to determine if the current on-going service(s) is with lower QoS or with higher QoS may be based on UE implementations. How to determine if the current on-going service(s) is with lower QoS or with higher QoS may be preconfigured or pre-defined. For example, NAS layer or upper layer of the UE may configure how to differentiate the current on-going service(s) is with lower QoS or with higher QoS.

In some implementations, a UE (e.g., a UE which is operating in multi-sim operation) may be currently RRC connected with network A (e.g., the UE is in RRC CONNECTED state in network A) but receive a paging from network B (e.g., the UE is in RRC_IDLE state or RRC_INACTIVE state in network B). If the received paging is for the UE (e.g., the UE's ID is included in the received UE record or in UE list) with a paging cause (e.g., included in or indicated by a second list), the lower layer(s) of the UE (e.g., the RRC layer of the UE) may send an indication or information to the upper layer(s) of the UE to inform the information related to the paging cause. Note that the upper layer(s) of the UE may or may not respond to the lower layer(s) of the UE (e.g., the RRC layer of the UE) after receiving the indication or information related to the paging cause.

In some implementations, a UE (e.g., a UE which is operating in multi-sim operation) may be currently RRC connected with network A but receive a paging from network B (e.g., the UE is in RRC_IDLE state or RRC_INACTIVE state in network B). If the received paging is for the UE (e.g., the UE's ID is included in the received UE record) with a paging cause related to voice service(s) (e.g., VoLTE, VoNR, or IMS voice service) or high priority service(s), the lower layer(s) of the UE (e.g., the RRC layer of the UE) may send an indication or information to the upper layer(s) of the UE to inform the information related to the paging cause. In some implementations, if the received paging is for the UE (e.g., the ID is included in the received UE record) with a paging cause not related to voice service(s) (e.g., VoLTE, VoNR, or IMS voice service) or high priority service(s), the lower layer(s) of the UE (e.g., the RRC layer of the UE) may send an indication or information to the upper layer(s) of the UE to inform the information related to the paging cause. Based on the received information related to the paging cause and/or the characteristics of the current on-going service(s), the upper layer(s) of the UE may indicate, by transmitting an indication to the lower layer(s) of the UE (e.g., the RRC layer of the UE), the lower layer(s) of the UE (e.g., a NAS indication) to transmit a network switch request message to network A or transmit a busy indication to network B in response to the paging or paging cause.

The upper layer indication (e.g., a NAS indication) may be one or more bit. In some implementations, if the upper layer indication (e.g., a NAS indication) is a one-bit indication and is set to true (or a specific value), the UE (or the RRC layer of the UE) may transmit a network switch request message to network A. Note that the UE may be able to transmit a network switch request message if the UE is allowed (e.g., by network A which the UE is RRC connected with) to transmit a network switch request message or if the base station is configured the UE to transmit a network switch request message if required.

In some implementations, if the upper layer indication (e.g., a NAS indication) is a one-bit indication and is set to false (or a specific value), the UE (or the RRC layer of the UE) may transmit a busy indication to network B which pages the UE. Note that the UE may be able to transmit a busy indication if the UE is allowed (e.g., by network B which the UE is not RRC connected with) to transmit a busy indication and/or the UE is capable of transmitting a busy indication.

In some implementations, a timer T1 may be started (e.g., by the RRC layer of the UE) upon the lower layer(s) of the UE (e.g., the RRC layer of the UE) sends an indication or information to the upper layer(s) of the UE to inform the information related to the paging cause. In some implementations, the timer T1 may be stopped (e.g., by the RRC layer of the UE) if the upper layer indication (e.g., a NAS indication) is received (by the RRC layer of the UE) while the timer T1 is still running. In some implementations, if the timer T1 expires, the UE may send a network switch request (e.g., to network A). In some implementations, if the timer T1 expires, the UE may send a busy indication (e.g., to network B). In some implementations, if the timer T1 expires, the UE may send a NAS message to the connected network (e.g., network A) so as to ask for a NAS release from the connected network (e.g., network A).

In some implementations, a network may broadcast an indication in system information to indicate if a UE (e.g., a UE in RRC_IDLE/RRC_INACTIVE state and/or in multi-SIM operation) is allowed to send a busy indication (and/or a non-busy indication) to the network (e.g., network B). In some implementations, a network (e.g., network B) may transmit an indication to the UE via dedicated signaling (e.g., a RRC Release message with suspend configuration) to indicate if a UE (e.g., a UE in RRC_INACTIVE state and/or in multi-SIM operation) is allowed to send a busy indication (and/or a non-busy indication) to the network (e.g., network B).

In some implementations, if a UE determines or is indicated to send a busy indication in response to a paging received from another network (e.g., network B), the UE may trigger a Random Access (RA) procedure to transmit the busy indicator or transmit the busy indication via a preconfigured Physical Uplink Shared Channel (PUSCH) resource. Note that a preconfigured PUSCH resource may be provided to the UE via dedicated signaling (e.g., an RRC Release message with or without suspend configuration). In some implementations, a busy indication may be a one-bit indication or a physical layer signal. For example, the UE may send a physical layer signal (or a busy indication) on a pre-defined or pre-configured time/frequency resource associated with the paging (e.g., paging DCI or PDSCH scheduling for paging message). The time/frequency resource for a UE to send a physical layer signal (or a busy indication) in response to the received paging may be configured/indicated in the paging message received by the UE. In some implementations, a UE may calculate a time/frequency resource for sending a physical layer signal (or a busy indication) in response to a paging bases on UE's UE ID and/or other parameters for busy indication (e.g., broadcast in system information).

In some implementations, if the busy indication is set (e.g., set to true or 1), a network (e.g., network B) receiving the busy indication may consider that the UE may not respond the paging. In some implementations, if the busy indication is set, a network (e.g., network B) receiving the busy indication may consider that the UE may not respond a paging with the same paging cause. In some implementations, if the busy indication is set, a network (e.g., network B) receiving the busy indication may consider that the UE may not respond a paging for a period. The period may be pre-defined or pre-configured or providing by the UE via a signaling (e.g., the signaling carries the busy indication) to the network. In some implementations, if the busy indication is set, a network (e.g., network B) receiving the busy indication may consider that the UE may not respond a paging with the same paging cause for a period. The period may be pre-defined or pre-configured or providing by the UE via a signaling (e.g., the signaling carries the busy indication) to the network.

In some implementations, after sending a busy indication to a network (e.g., network B), the UE may keep monitoring paging occasion(s) of the network. In some implementations, after sending a busy indication to a network (e.g., network B), the UE may not monitor paging occasion(s) of the network within a period. In some implementations, a timer T2 may be started (e.g., by the RRC layer of the UE) upon a busy indication is transmitted. In some implementations, the timer T2 may be stopped (e.g., by the RRC layer of the UE) if multi-sim status of the UE changes (e.g., from ON to OFF) or the UE is able to connect to any network. For example, assuming a UE is currently be RRC connected with network A and sends a busy indication to network B. If the timer T2 is still running and the UE is no longer RRC connected with network A, the timer T2 may be stopped (e.g., by the RRC layer of the UE). The UE may inform network B that the UE itself is not busy anymore (e.g., by a non-busy indication or by setting busy indication to false), and the UE may start monitoring/receiving paging(s) from network B. The UE may start monitoring/receiving paging(s) from network B upon the UE successfully informed network B that the UE is not busy anymore. In some implementations, if the timer T2 expires, the UE may start monitoring paging occasion(s) of the network which received a busy indication from the UE before.

In some implementations, a busy indication may be included in a response message. In some implementations, the response message may also carry other information such as a period that the UE may not monitor the paging occasion(s) configured by the network, wherein the network receives the busy indication or paging cause(s) which may be responded.

In some implementations, if a UE determines or is indicated to send a busy indication in response to a paging received from another network (e.g., network B), the UE may first ask the network (e.g., network A) RRC connected with the UE for a scheduling gap for busy indication transmission (or for long leaving). In some implementations, if a UE determines or is indicated to send a busy indication in response to a paging received from another network (e.g., network B), the UE may ask for a scheduling gap for busy indication transmission (or for long leaving) if a scheduling gap (or a measurement gap) configured to receive a paging from another network is not sufficient to complete the procedure of busy indication transmission. In some implementations, if a UE determines or is indicated to send a busy indication in response to a paging received from another network (e.g., network B), the UE may ask for a scheduling gap for busy indication transmission (or for long leaving) by transmitting information related to the scheduling gap for busy indication transmission to a network (e.g., network A which the UE is currently RRC connected with).

In some implementations, a network which receives the information related to the scheduling gap for busy indication transmission (or for long leaving) may provide a scheduling gap for busy indication transmission. Note that a scheduling gap may be a one-shot gap or a periodic gap. The information related to the scheduling gap for busy indication transmission may include the timer period required for busy indication transmission. The UE may expect the timer period required for busy indication transmission based on the current quality (e.g., the current signa quality of the camped cell of network B), loading information (e.g., the loading of the camped cell of network B), or other information broadcasting by another network (e.g., network B).

In some implementations, a UE may not be allowed to send a busy indication if no scheduling gap (or corresponding configuration) for busy indication transmission (or long leaving) is received by the UE. In some implementations, a timer T3 may be started (e.g., by the RRC layer of the UE) upon a UE transmitting information related to the scheduling gap for busy indication transmission. In some implementations, upon starting a procedure of busy indication transmission, a timer T3 may be started (e.g., by the RRC layer of the UE). In some implementations, the timer T3 may be stopped (e.g., by the RRC layer of the UE) when a scheduling gap (or corresponding configuration) for busy indication transmission is received. In some implementations, if the timer T3 expires, the UE may stop/suspend the procedure of busy indication transmission and/or the lower layer(s) of the UE may notify the procedure of busy indication transmission is stopped/suspended to the upper layer (s) of the UE. In some implementations, if a UE cannot complete the procedure of busy indication transmission in a single scheduling gap (or corresponding configuration) configured for busy indication transmission, the UE may stop/suspend the procedure of busy indication transmission and/or the lower layer(s) of the UE may notify the procedure of busy indication transmission is stopped/suspended to the upper layer(s) of the UE. In some implementations, if attempts of busy indication transmission(s) reach the maximum number, the UE may stop/suspend the procedure of busy indication transmission and/or the lower layer(s) of the UE may notify the procedure of busy indication transmission is stopped/suspended to the upper layer(s) of the UE. The maximum number may be pre-defined or configurable.

In some implementations, if the non-busy indication is set, a network (e.g., network B) receiving the non-busy indication may consider that the UE may start monitoring paging occasion(s) of the network. In some implementations, after sending a non-busy indication to a network (e.g., network B), the UE may start monitoring paging occasion(s) of the network. In some implementations, a UE may send a non-busy indication to a network (e.g., network B) when the UE no longer is multi-SIM operation (e.g., the multi-sim status changes from ON to OFF). In some implementations, a UE may send a non-busy indication to a network (e.g., network B) when the status of network A is changed (e.g., the traffic priority on network A is different). In some implementations, a UE may send a non-busy indication to a network (e.g., network B) when the RRC state of network A is changed (e.g., the RRC state of network A is transitioned to IDLE or Inactive state).

In some implementations, if a UE is operating in a multi-SIM operation (e.g., the UE is (pre)configured or installed with at least two USIM(s) or the UE is currently RRC connected with network A but receive a paging from network B), network A may be prohibited to configure the UE to enter into a dual-connectivity mode (e.g., EN-DC or MR-DC as introduced in TS 37.340). In some implementations, if a UE is operating in a multi-SIM operation (e.g., the UE is (pre)configured or installed with at least two USIM(s) or the UE is currently RRC connected with network A but receive a paging from network B), network A may be prohibited to configure the UE to enter into a dual-connectivity mode based on the UE's architecture (or type of RF chain) and/or the UE's mode (e.g., DSDS or DSDA), but not limited to. In some implementations, if a UE is operating in a multi-SIM operation (e.g., the UE is (pre)configured or installed with at least two USIM(s) or the UE is currently RRC connected with network A but receive a paging from network B), the UE may inform network A whether the UE can be configured to enter into a dual-connectivity mode (e.g., EN-DC or MR-DC as introduced in TS 37.340).

Figure 2:
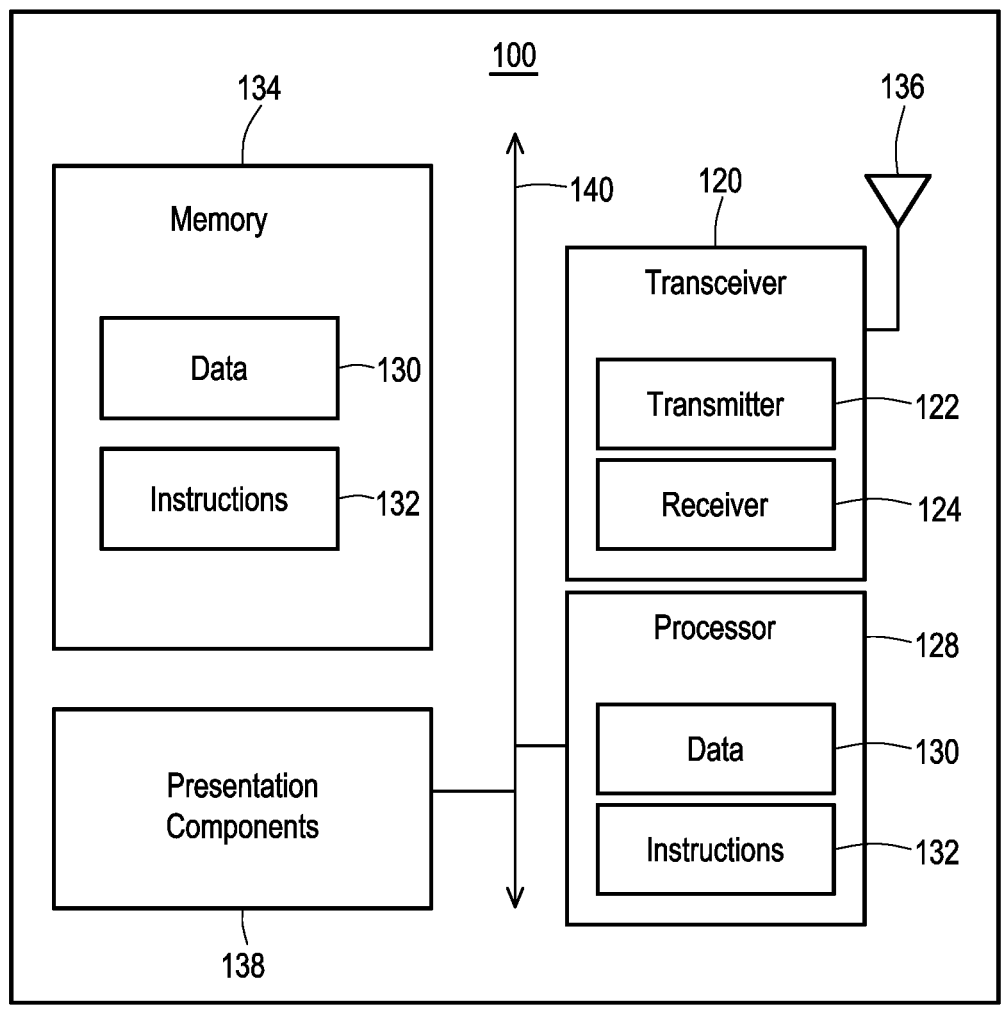
FIG. 2 illustrates a block diagram of node for wireless communication according to an embodiment of the present disclosure.

FIG. 2 illustrates a block diagram of node 100 for wireless communication according to an embodiment of the present disclosure. As shown in FIG. 2, node 100 may include a transceiver 120, a processor 128, a memory 134, one or more presentation components 138, and at least one antenna 136. The node 100 may also include an RF spectrum band module, a base station communications module, a network communications module, a system communications management module, Input/Output (I/O) ports, I/O components, or power supply (not explicitly shown in FIG. 2). Each of these components may be in communication with each other, directly or indirectly, over one or more buses 140. In one implementation, the node 100 may be a UE or a base station that performs various functions described herein.

The transceiver 120 having a transmitter 122 (e.g., transmitting/transmission circuitry) and a receiver 124 (e.g., receiving/reception circuitry) may be configured to transmit and/or receive time and/or frequency resource partitioning information. In some implementations, the transceiver 120 may be configured to transmit in different types of subframes and slots including, but not limited to, usable, non-usable and flexibly usable subframes and slot formats. The transceiver 120 may be configured to receive data and control channels.

The node 100 may include a variety of computer-readable media. Computer-readable media can be any available media that can be accessed by the node 100 and include both volatile and non-volatile media, and removable and non-removable media. By way of example, and not limitation, computer-readable media may comprise computer storage media and communication media. Computer storage media includes both volatile and non-volatile, and removable and non-removable media implemented in any method or technology for storage of information such as computer-readable.

Computer storage media includes RAM, ROM, EEPROM, flash memory, or other memory technology, CD-ROM, Digital Versatile Disks (DVD), or other optical disk storage, magnetic cassettes, magnetic tape, magnetic disk storage, or other magnetic storage devices. Computer storage media does not comprise a propagated data signal. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 134 may include computer-storage media in the form of volatile and/or non-volatile memory. The memory 134 may be removable, non-removable, or a combination thereof. Exemplary memory includes solid-state memory, hard drives, optical-disc drives, and etc. As illustrated in FIG. 2, the memory 134 may store computer-readable, computer-executable instructions 132 (e.g., software codes) that are configured to, when executed, cause the processor 128 to perform various functions described herein. Alternatively, the instructions 132 may not be directly executable by the processor 128 but be configured to cause the node 100 (e.g., when compiled and executed) to perform various functions described herein.

The processor 128 (e.g., having processing circuitry) may include an intelligent hardware device, such as a Central Processing Unit (CPU), a microcontroller, an ASIC, and etc. The processor 128 may include memory. The processor 128 may process the data 130 and the instructions 132 received from the memory 134, and information through the transceiver 120, the base band communications module, and/or the network communications module. The processor 128 may also process information to be sent to the transceiver 120 for transmission through the antenna 136, to the network communications module for transmission to a core network.

One or more presentation components 138 presents data indications to a person or other device. Exemplary presentation components 138 include a display device, speaker, printing component, vibrating component, and etc.

Figure 3:
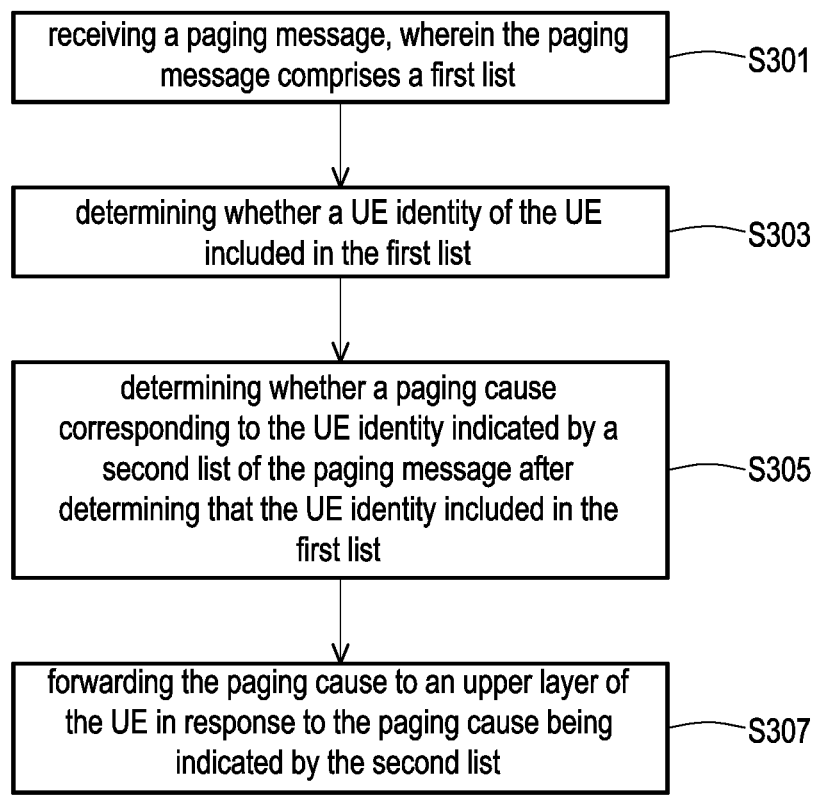
FIG. 3 illustrates a flowchart of a method of performing a paging reception according to an embodiment of the present disclosure.

FIG. 3 illustrates a flowchart of a method of performing a paging reception according to an embodiment of the present disclosure, wherein the method may be implemented by a node as shown in FIG. 2. In step S301, receiving a paging message, wherein the paging message comprises a first list. In some implementations, a UE may receive a CN paging in RRC_IDLE state. In some implementations, a UE may receive a RAN paging in RRC_INACITVE state. In step S303, determining whether a UE identity of the UE included in the first list. In some implementations, each entry of the first list may record at least a corresponding UE identity. In some implementations, if a UE receive a CN paging or is in RRC_IDLE state, the UE may determine if its 5G-S-TMSI is included in the first list. In some implementations, if a UE receives a RAN paging or is in RRC_INACTIVE state, the UE may determine if its full I-RNTI is included in the first list. In step S305, determining whether a paging cause corresponding to the UE identity indicated by a second list of the paging message after determining that the UE identity included in the first list. In some implementations, each entry of the second list may record/indicate a corresponding paging cause. In some implementations, if a paging cause is present in an entry of the second list, the paging cause is related to a voice service (e.g., a IMS voice service). In some implementations, if a paging cause is not present (or absent) in an entry of the second list, the paging cause is related to a service not associated with a voice service (e.g., a IMS voice service). In some implementations, the number of entries of the first list is equal to the number of entries of the second list and listed in the same order. In step S307, forwarding the paging cause to an upper layer of the UE in response to the paging cause being indicated by the second list. In some implementations, the UE may further forward the UE identity corresponding to the paging cause from the RRC layer of the UE to the upper layer of the UE.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of paging reception, performed by a user equipment (UE), the method comprising:
   receiving a paging message, wherein the paging message comprises a first list;
   determining whether a UE identity of the UE is included in the first list;
   determining whether a paging cause corresponding to the UE identity is indicated by a second list of the paging message after determining that the UE identity is included in the first list, wherein a number of entries of the first list is equal to a number of entries of the second list; and
   forwarding the paging cause to an upper layer of the UE in response to the paging cause being indicated by the second list.

2. The method of claim 1, further comprising:
   determining the paging cause is associated with a voice service in response to the paging cause being indicated by the second list.

3. The method of claim 2, wherein an entry of the second list corresponds to the paging cause, the method further comprising:
   determining the paging cause is associated with a service other than the voice service in response to determining that the entry is not present in the second list.

4. The method of claim 1, further comprising:
transmitting a second message, wherein the second message indicates a capability of supporting multiple subscriber identity module (multi-SIM) operations.

5. The method of claim 1, further comprising:
receiving a scheduling gap configuration from a first network via a radio resource control (RRC) connection between the UE and the first network; and
monitoring a second network according to the scheduling gap configuration to receive the paging message.

6. The method of claim 5, further comprising:
transmitting, by the upper layer, an indication to an RRC layer of the UE according to the paging cause.

7. The method of claim 6, further comprising:
transmitting a network switch request message to the first network according to the indication.

8. The method of claim 6, further comprising:
transmitting a busy indication to the second network according to the indication.

9. The method of claim 1, further comprising:
forwarding the UE identity to the upper layer in response to the UE identity being included in the first list.

10. A user equipment (UE), comprising:
one or more non-transitory computer-readable media storing computer-executable instructions; and
at least one processor coupled to the one or more non-transitory computer-readable media, and configured to execute the one or more computer-executable instructions to:
receive a paging message, wherein the paging message comprises a first list;
determine whether a UE identity of the UE is included in the first list;
determining whether a paging cause corresponding to the UE identity is indicated by a second list of the paging message after determining that the UE identity is included in the first list, wherein a number of entries of the first list is equal to a number of entries of the second list; and
forward the paging cause to an upper layer of the UE in response to the paging cause being indicated by the second list.

11. The user equipment of claim 10, wherein the at least one processor is further configured to execute the computer-executable instructions further to:
determine the paging cause is associated with a voice service in response to the paging cause being indicated by the second list.

12. The user equipment of claim 11, wherein an entry of the second list corresponds to the paging cause, wherein the at least one processor is furhter configured to execute the computer-executable instructions further to:
determine the paging cause is associated with a service other than the voice service in response to determining that the entry is being not present in the second list.

13. The user equipment of claim 10, wherein the at least one processor is further configured to execute the computer-executable instructions to:
transmit a second message, wherein the second message indicates a capability of supporting multiple subscriber identity module (multi-SIM) operations.

14. The user equipment of claim 10, wherein the at least one processor is further configured to execute the computer-executable instructions to:
receive a scheduling gap configuration from a first network via a radio resource control (RRC) connection between the UE and the first network; and
monitor a second network according to the scheduling gap configuration to receive the paging message.

15. The user equipment of claim 14, wherein the at least one processor is further configured to execute the computer-executable instructions to:
transmit, by the upper layer, an indication to an RRC layer of the UE according to the paging cause.

16. The user equipment of claim 15, wherein the at least one processor is further configured to execute the computer-executable instructions to:
transmit a network switch request message to the first network according to the indication.

17. The user equipment of claim 15, wherein the at least one processor is further configured to execute the computer-executable instructions to:
transmit a busy indication to the second network according to the indication.

18. The user equipment of claim 10, wherein the at least one processor is further configured to execute the computer-executable instructions to:
forward the UE identity to the upper layer in response to the UE identity being in the first list.

* * * * *